United States Patent
Juan Lien Chang et al.

(10) Patent No.: US 9,835,225 B2
(45) Date of Patent: Dec. 5, 2017

(54) INTERLOCK SYSTEM FOR RING GEAR ON FLYWHEELS

(71) Applicant: Schaeffler Technologies AG & Co. KG, Herzogenaurach (DE)

(72) Inventors: Raymundo Juan Lien Chang, Puebla (MX); Jean Baptiste Coulibaly, Gengenbach (DE); Gabriela Guerra Galán, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/829,232

(22) Filed: Aug. 18, 2015

(65) Prior Publication Data
US 2016/0053849 A1    Feb. 25, 2016

Related U.S. Application Data

(60) Provisional application No. 62/040,740, filed on Aug. 22, 2014.

(51) Int. Cl.
*F16F 15/30* (2006.01)
*F16F 15/315* (2006.01)

(52) U.S. Cl.
CPC .......... *F16F 15/30* (2013.01); *F16F 15/3153* (2013.01)

(58) Field of Classification Search
CPC ...... F16F 15/30; F16F 15/315; F16F 15/3153; F16H 2048/385; F16H 2048/382; F16H 55/12
See application file for complete search history.

(56) References Cited

U.S. PATENT DOCUMENTS

| | | | | |
|---|---|---|---|---|
| 4,631,973 A | * | 12/1986 | Eley | B23P 11/025 29/447 |
| 2015/0300474 A1 | * | 10/2015 | Kurosaki | F16H 55/17 475/344 |

FOREIGN PATENT DOCUMENTS

JP    2001003990 A  *  1/2001  ............. F16F 15/30

* cited by examiner

*Primary Examiner* — Thomas C Diaz
(74) *Attorney, Agent, or Firm* — LeKeisha M. Suggs

(57) ABSTRACT

A flywheel assembly for a prime mover includes a flywheel and a ring gear. The flywheel has a first plurality of apertures for receiving a first plurality of fasteners for fixing the flywheel to a prime mover, a first cylindrical ring portion including a first outer diameter, a second cylindrical ring portion at a first distal end of the first cylindrical ring portion and including a second outer diameter, larger than the first outer diameter, and a third cylindrical ring portion at a second distal end of the first cylindrical ring portion, opposite the first distal end, and including a third outer diameter, larger than the second outer diameter. The flywheel also has a first wall connecting the first distal end of the first cylindrical ring and a third distal end of the second cylindrical ring portion. The ring gear is engaged with the first cylindrical ring portion.

17 Claims, 5 Drawing Sheets

INTERLOCK SYSTEM FOR RING GEAR ON FLYWHEELS

FIELD

The invention relates generally to a flywheel for a prime mover, and more specifically to an interlock system for a ring gear on a flywheel.

BACKGROUND

Flywheels for prime movers, or combustion engines, are known. A ring gear is often fixed to the flywheel to aid in starting the combustion engine. A starter includes a gear for engaging with the ring gear to spin the flywheel and rotate the engine. This begins the combustion process.

It is known to attach a ring gear to a flywheel by press-fitting or shrink fitting the gear onto a cylindrical ring of the flywheel. In either case, an inner diameter of the ring gear is slightly smaller than an outer diameter of the flywheel ring. For press-fitting, the smaller ring gear inner diameter is forced under load onto the larger flywheel outer diameter. Shrink fitting eases this process by heating the ring gear to increase the inner diameter and/or cooling the flywheel to reduce the outer diameter so that less load or even no load is required to assemble the components.

Testing under extreme maneuvers, or extreme operating conditions, such as high heat and/or high speed can expand the ring gear such that it can loosen on the flywheel. For example, a slipping clutch can generate excess heat, reducing clutch torque capacity allowing the engine to "run away" or reach high rotational speeds. In extreme cases, testing has shown that some ring gears can loosen on the flywheel causing internal damage to the engine or transmission. In exceptional cases, a dislodged ring gear may even injure vehicle passengers.

BRIEF SUMMARY

Example aspects broadly comprise a flywheel assembly for a prime mover including a flywheel and a ring gear. The flywheel has a first plurality of apertures for receiving a first plurality of fasteners for fixing the flywheel to a prime mover, a first cylindrical ring portion including a first outer diameter, a second cylindrical ring portion at a first distal end of the first cylindrical ring portion and including a second outer diameter, larger than the first outer diameter, and a third cylindrical ring portion at a second distal end of the first cylindrical ring portion, opposite the first distal end, and including a third outer diameter, larger than the second outer diameter. The flywheel also has a first wall connecting the first distal end of the first cylindrical ring and a third distal end of the second cylindrical ring portion. The ring gear is engaged with the first cylindrical ring portion.

In an example embodiment, the ring gear includes a plurality of gear teeth. In an example embodiment, the first wall is a radial or conical wall. In an example embodiment, the ring gear includes a fourth cylindrical ring portion compressively engaged with the first cylindrical ring portion. In an example embodiment, the flywheel further includes a conical ring portion extending radially inward from a fourth distal end of the second cylindrical ring portion, opposite the third distal end.

In some example embodiment, the flywheel further includes a second wall extending radially inward from the third cylindrical ring portion. In some example embodiments, the flywheel further includes an undercut portion connecting the second distal end of the first cylindrical ring portion to the second wall. In an example embodiment, the ring gear is disposed axially between the first and second walls. In an example embodiment, the flywheel further includes a second plurality of apertures for receiving a second plurality of fasteners for fixing a clutch assembly to the flywheel.

Other example aspects broadly comprise a method of installing a ring gear on a flywheel including providing a flywheel with a first ring portion with a first diameter and a second ring portion with a second diameter larger than the first diameter, providing a ring gear with a third ring portion with a third diameter smaller than the flywheel first diameter, sliding the ring gear third cylindrical ring portion over the flywheel second cylindrical ring portion to engage the flywheel first cylindrical ring portion. In an example embodiment, sliding the ring gear includes providing a force to press the ring gear onto the flywheel. In an example embodiment, the ring gear is heated to expand the third ring portion third diameter prior to sliding the ring gear. In an example embodiment, the flywheel is cooled to contract respective first and second diameters of the first and second ring portions prior to sliding the ring gear.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Figure 1:
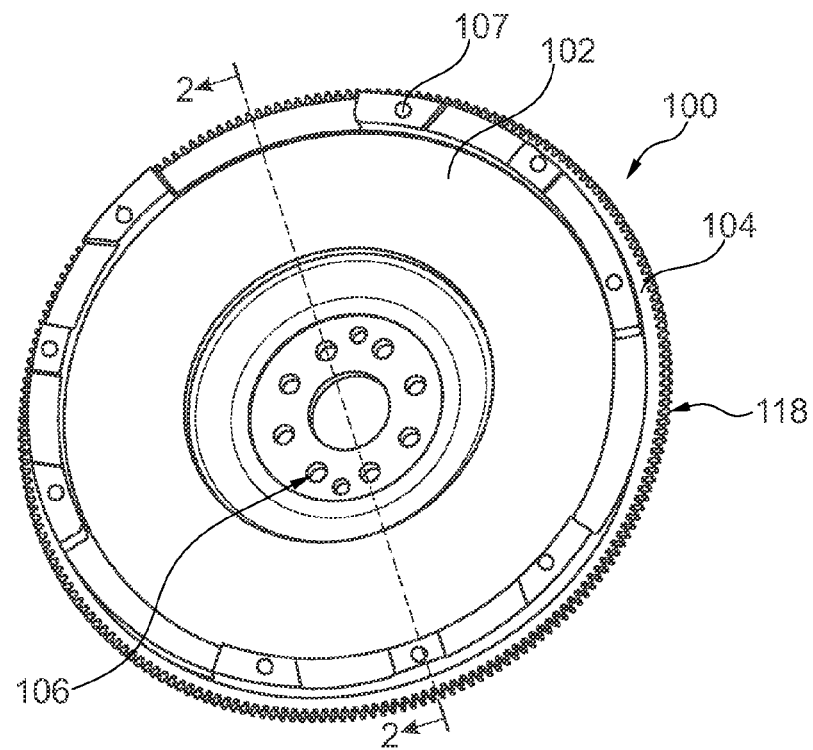
FIG. 1 is a back perspective view of a prior art flywheel assembly 100.
Figure 2:
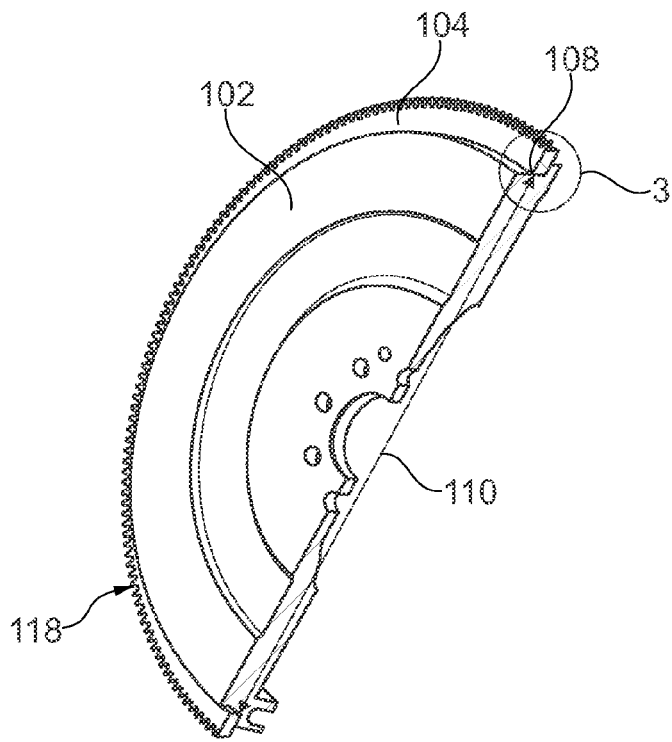
FIG. 2 is a perspective section view of the prior art flywheel assembly of FIG. 1 taken generally along line 2-2 in FIG. 1.
Figure 3:
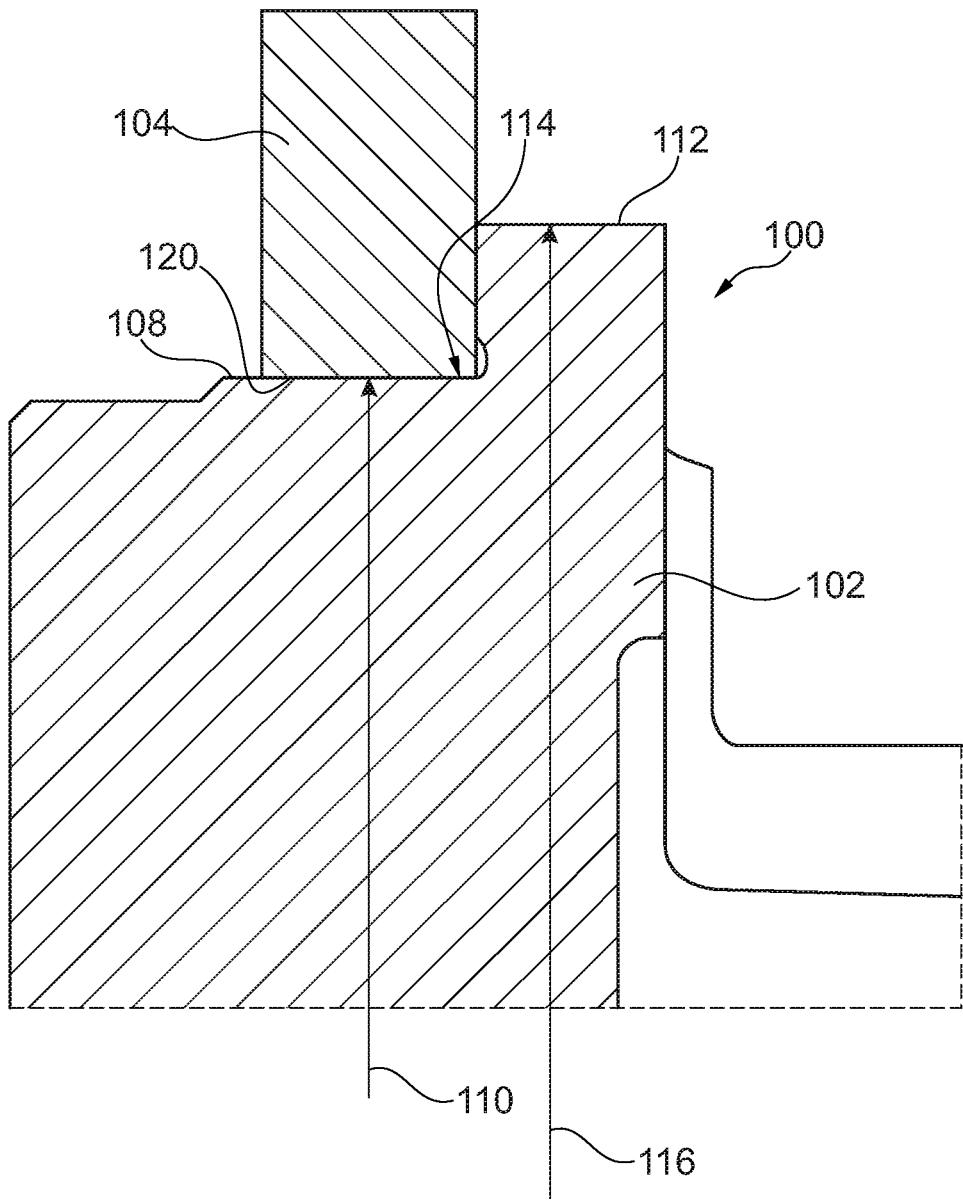
FIG. 3 is a detail view of encircled region 3 in FIG. 2.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described. The following description is made with reference to FIGS. 1-3. FIG. 1 is a back perspective view of prior art flywheel assembly 100. FIG. 2 is a perspective section view of flywheel assembly 100 taken generally along line 2-2 in FIG. 1. FIG. 3 is a detail view of encircled region 3 in FIG. 2. Flywheel assembly 100 includes flywheel 102 and ring gear 104. Flywheel 102 includes apertures, or holes, 106 for receiving a plurality of fasteners (not shown) for fixing the flywheel to a prime mover (not shown) apertures 107 for receiving a plurality of fasteners for fixing a clutch assembly to the flywheel as is known in the art.

Flywheel 102 includes cylindrical ring portion 108 with outer diameter 110 and cylindrical ring portion 112 at distal end 114 of ring portion 108 with outer diameter 116, larger than outer diameter 110. Ring gear 104 is engaged with ring portion 108. Ring gear 104 includes gear teeth 118 and cylindrical ring portion 120 compressively engaged with ring portion 108. That is, the ring gear must be installed on the flywheel by force or by heating/cooling the components as described above. Once installed, the ring gear is generally not removable without force during normal conditions.

Figure 4:
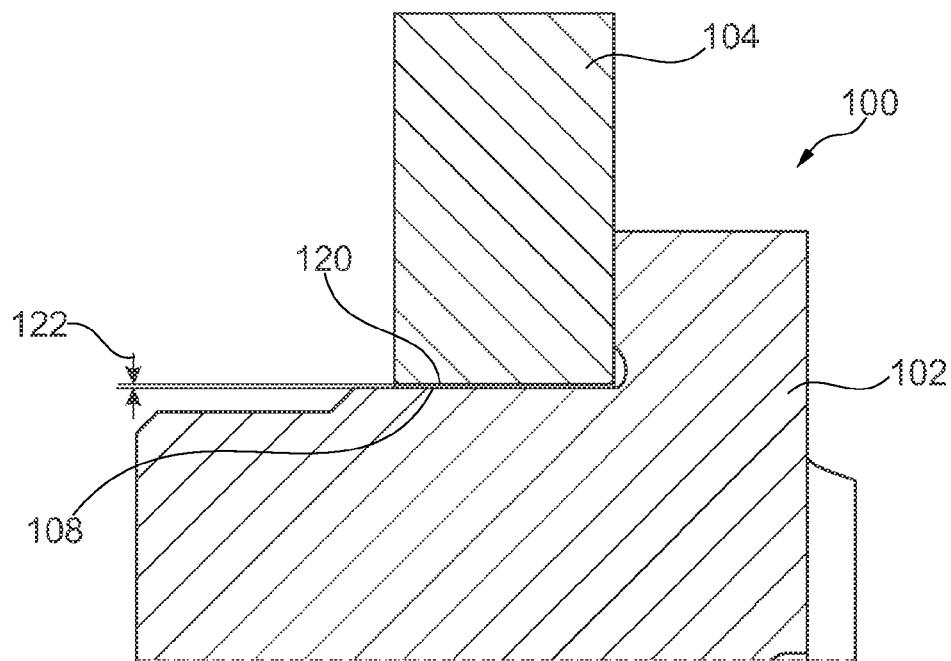
FIG. 4 is a detail view of the prior art flywheel assembly of FIG. 1 tested at extreme operating conditions.
Figure 5:
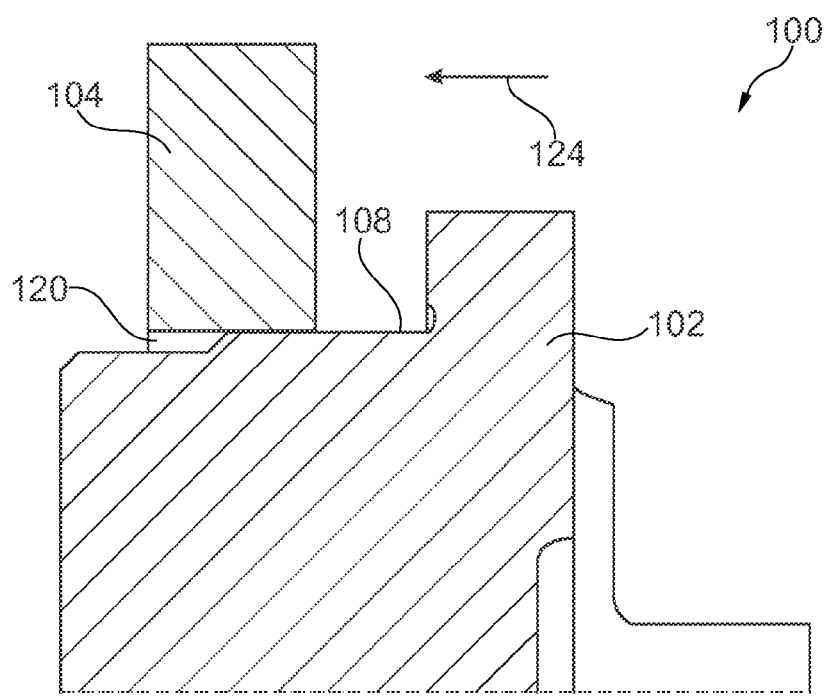
FIG. 5 is a detail view of the prior art flywheel assembly of FIG. 1 showing a displaced ring gear.

The following description is made with reference to FIGS. 4-5. FIG. 4 is a detail view of flywheel assembly 100 tested at extreme operating conditions. FIG. 5 is a detail view of flywheel assembly 100 showing displaced ring gear 104. As is shown in FIG. 4, extreme operating conditions can lead to radial expansion of ring portion 120 creating gap 122 between portion 120 and flywheel ring portion 108. As can be seen in FIG. 5, the ring gear can be axially displaced in direction of arrow 124 when the gap is present. That is, the gap indicates that the ring gear is loose on the flywheel and axially slidable. In extreme cases, the ring gear can become totally dislodged from the flywheel.

Figure 6:
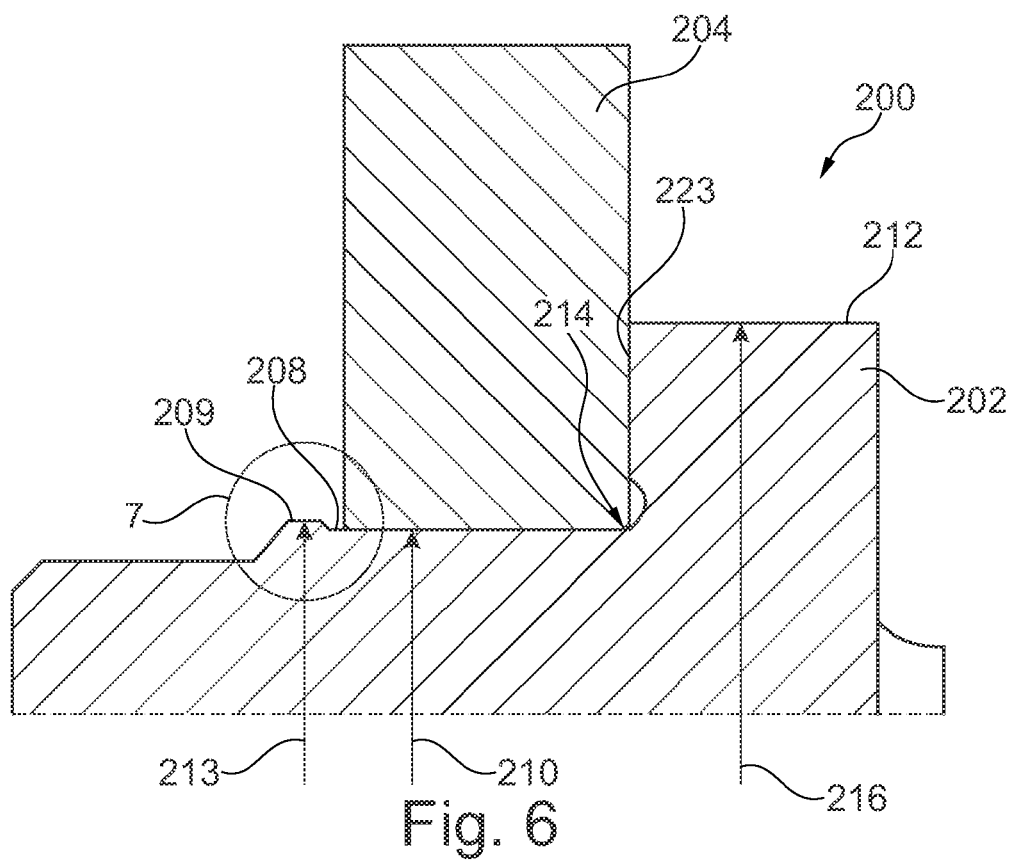
FIG. 6 is a detail view of a flywheel assembly according to an example aspect.
Figure 7:
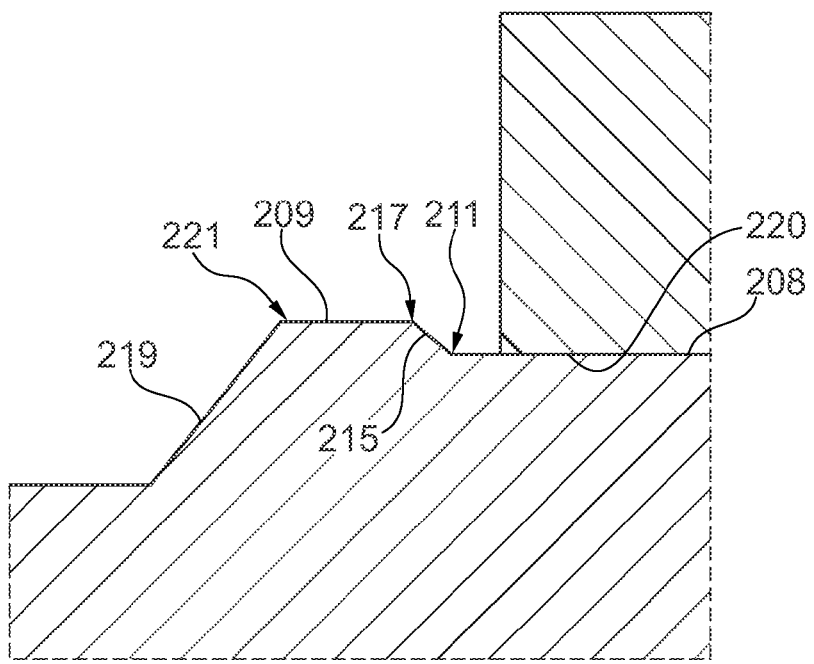
FIG. 7 is a detail view of encircled region 7 in FIG. 6.

The following description is made with reference to FIGS. 6-7. FIG. 6 is a detail view of flywheel assembly 200 according to an example aspect. FIG. 7 is a detail view of encircled region 7 in FIG. 6. Flywheel assembly 200 includes flywheel 202 and ring gear 204. Flywheel 202 includes apertures (not shown) for receiving a first plurality of fasteners (not shown) for fixing the flywheel to a prime mover (not shown). Flywheel 202 includes cylindrical ring portion 208 including outer diameter 210, cylindrical ring portion 209 at distal end 211 of cylindrical ring portion 208 with outer diameter 213, larger than outer diameter 210, and cylindrical ring portion 212 at distal end 214 of cylindrical ring portion 208, opposite distal end 211, with outer diameter 216, larger than outer diameter 213. Flywheel 202 further includes wall 215 connecting distal end 211 of cylindrical ring 208 and distal end 217 of cylindrical ring portion 209. Wall 215 may be a radial wall or a conical wall as shown in FIG. 7.

Ring gear 204 is engaged with cylindrical ring portion 208. Ring gear 204 includes a plurality of gear teeth (not shown) similar to those of ring gear 104 in FIG. 1. Ring gear 204 includes cylindrical ring portion 220 compressively engaged with cylindrical ring portion 208. Flywheel 202 further comprises conical ring portion 219 extending radially inward from distal end 221 of cylindrical ring portion 209, opposite distal end 217. Flywheel 202 further comprises radial wall 223 extending radially inward from the cylindrical ring portion 212 and undercut portion 225 connecting distal end 214 of cylindrical ring portion 208 to radial wall 223. Ring gear 204 is disposed axially between walls 215 and 223. Flywheel 202 includes apertures (not shown), similar to apertures 107 in FIG. 1, for receiving a plurality of fasteners for fixing a clutch assembly to the flywheel as is known in the art.

Figure 8:
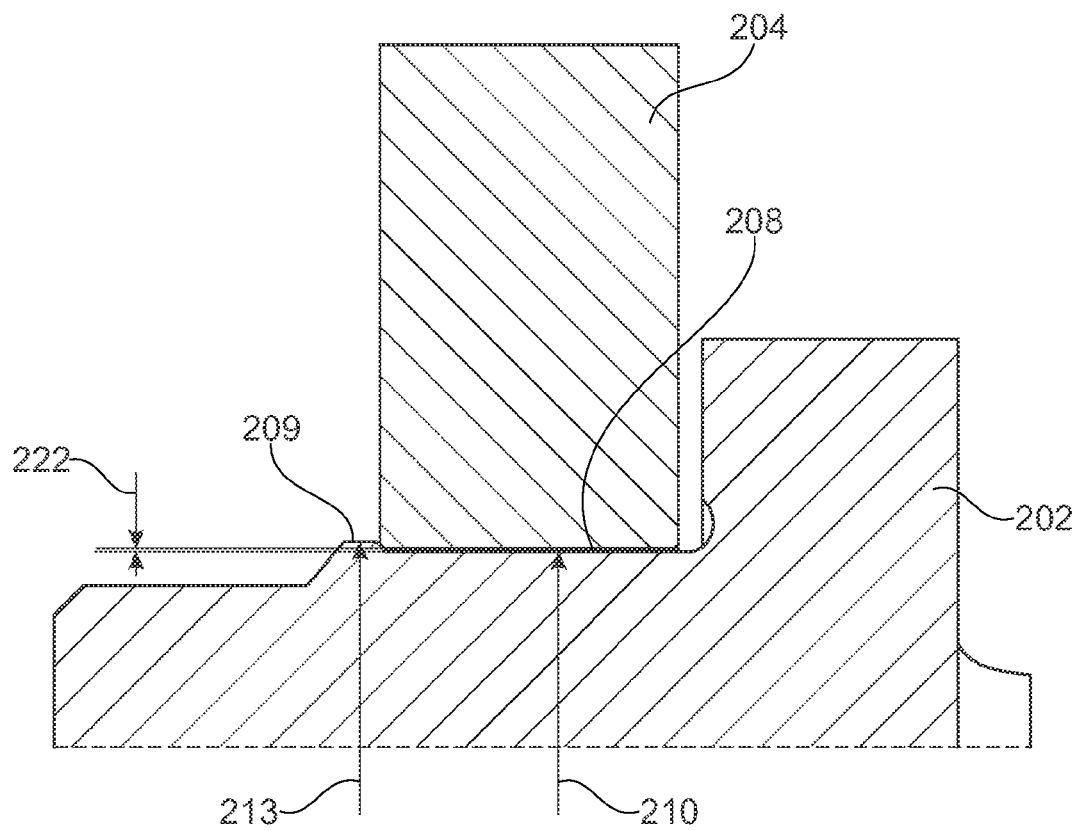
FIG. 8 is a detail view of the flywheel assembly of FIG. 6 showing a displaced ring gear.

The following description is made with reference to FIG. 8. FIG. 8 is a detail view of flywheel assembly 200 of FIG. 6 showing a displaced ring gear. As can be seen from FIG. 8, even though the ring gear may still loosen on the flywheel during extreme maneuvers, diameter 213 of portion 209 is large enough so that wall 215 prevents ring gear 204 from become dislodged as shown in FIG. 5. That is, the diameter of portion 213 is more than the diameter of portion 208 plus additional gap 222.

The present disclosure also includes a method of installing a ring gear on a flywheel including providing flywheel 202 with ring portion 208 with diameter 210 and ring portion 209 with diameter 213, larger than first diameter 210, providing ring gear 204 with ring portion 220 with a diameter smaller than diameter 210, and sliding ring portion 220 over ring portion 209 to engage ring portion 208. Sliding the ring gear may include providing a force to press the ring gear onto the flywheel. The ring gear may be heated to expand the diameter of ring portion 220 prior to sliding the ring gear. The flywheel may be cooled to contract respective diameters 210 and 213 of ring portions 208 and 209 prior to sliding the ring gear.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A flywheel assembly for a prime mover comprising:
  a flywheel including:
    a first plurality of apertures for receiving a first plurality of fasteners for fixing the flywheel to a prime mover;
    a first cylindrical ring portion including a first outer diameter and a first width;
    a second cylindrical ring portion at a first distal end of the first cylindrical ring portion and including a second outer diameter, larger than the first outer diameter;
    a third cylindrical ring portion at a second distal end of the first cylindrical ring portion, opposite the first distal end, and including a third outer diameter, larger than the second outer diameter; and,
    a first wall connecting the first distal end and a third distal end of the second cylindrical ring portion;
    a conical ring portion extending radially inward from a fourth distal end of the second cylindrical ring portion, opposite the third distal end, toward the second cylindrical ring portion; and,
    a ring gear compressively engaged with the first cylindrical ring portion and including a second width, less than the first width.

2. The flywheel assembly of claim 1 wherein the ring gear includes a plurality of gear teeth.

3. The flywheel assembly of claim 1 wherein the first wall is a radial or conical wall.

4. The flywheel assembly of claim 1 wherein the flywheel further comprises a second wall extending radially inward from the third cylindrical ring portion.

5. The flywheel assembly of claim 4 wherein the flywheel further comprises an undercut portion connecting the second distal end to the second wall.

6. The flywheel assembly of claim 5 wherein the ring gear is disposed axially between the first and second walls.

7. The flywheel assembly of claim 1 wherein the flywheel further comprises a second plurality of apertures for receiving a second plurality of fasteners for fixing a clutch assembly to the flywheel.

8. A method of installing a ring gear on a flywheel comprising:
   providing a flywheel with a first cylindrical ring portion with a first diameter and a first width and a second cylindrical ring portion with a second diameter larger than the first diameter;
   providing a ring gear with a third cylindrical ring portion with a third diameter smaller than the first diameter and a second width less than the first width;
   sliding the ring gear third cylindrical ring portion over a conical ring portion extending radially inward towards the first cylindrical ring portion and compressively engaging the third cylindrical ring portion with the first cylindrical ring portion.

9. The method of claim 8 wherein sliding the ring gear includes providing a force to press the ring gear onto the flywheel.

10. The method of claim 8 wherein the ring gear is heated to expand the third diameter prior to sliding the ring gear.

11. The method of claim 8 wherein the flywheel is cooled to contract respective first and second diameters of the first and second cylindrical ring portions prior to sliding the ring gear.

12. The method of claim 8 wherein the second outer diameter is larger than the third outer diameter after the ring gear is installed.

13. A flywheel assembly for a prime mover comprising:
   a flywheel including:
      a first plurality of apertures for receiving a first plurality of fasteners for fixing the flywheel to a prime mover;
      a first ring portion including a first outer diameter and a first width;
      a second ring portion at a first distal end of the first ring portion and including a second outer diameter, larger than the first outer diameter;
      a third ring portion at a second distal end of the first ring portion, opposite the first distal end, and including a third outer diameter, larger than the second outer diameter; and,
      a first wall connecting the first distal end and a third distal end of the second ring portion;
      a conical ring portion extending radially inward from a fourth distal end of the second ring portion that is opposite the first distal end;
   a ring gear to engage with the first ring portion,
   wherein the second ring portion prevents the ring gear from becoming dislodged, and
   wherein the first outer diameter is consistent across a width of the first ring portion, and
   wherein the first width is greater than a ring gear width.

14. The flywheel assembly of claim 13 wherein the first wall is a radial or conical wall.

15. The flywheel assembly of claim 13 wherein the ring gear includes a fourth ring portion compressively engaged with the first ring portion.

16. The flywheel assembly of claim 13 wherein the flywheel further comprises a second wall extending radially inward from the third ring portion.

17. The flywheel assembly of claim 16 wherein the flywheel further comprises an undercut portion connecting the second distal end to the second wall.

* * * * *